(12) United States Patent
Nakata

(10) Patent No.: US 6,642,333 B2
(45) Date of Patent: Nov. 4, 2003

(54) VINYLPYRROLIDONE (CO)POLYMER

(75) Inventor: Yoshitomo Nakata, Nishinomiya (JP)

(73) Assignees: Nippon Shokubai Co., Ltd., Osaka (JP); Dai-ichi Kogyo Seiyaku Co., Ltd., Kyoto (JP)

( * ) Notice: Subject to any disclaimer, the term of this patent is extended or adjusted under 35 U.S.C. 154(b) by 0 days.

(21) Appl. No.: 10/394,148

(22) Filed: Mar. 24, 2003

(65) Prior Publication Data

US 2003/0191260 A1 Oct. 9, 2003

(30) Foreign Application Priority Data

Apr. 4, 2002 (JP) ........................ 2002-103054

(51) Int. Cl.$^7$ .............................................. C08F 26/08
(52) U.S. Cl. ................... 526/264; 526/218.1; 526/227; 526/263
(58) Field of Search .................... 526/218.1, 227, 526/264, 263

(56) References Cited

U.S. PATENT DOCUMENTS

| | | | |
|---|---|---|---|
| 3,700,761 A | * | 10/1972 | O'Driscoll et al. ............ 264/1 |
| RE29,231 E | * | 5/1977 | Leeds ........................ 260/885 |
| 5,625,076 A | | 4/1997 | Shimasaki et al. |
| 5,801,252 A | | 9/1998 | Yano et al. |
| 5,912,312 A | * | 6/1999 | Zhong et al. ................ 526/263 |
| 6,391,994 B2 | | 5/2002 | Tomihisa et al. |

FOREIGN PATENT DOCUMENTS

| | | |
|---|---|---|
| JP | 8-141402 | 6/1996 |
| JP | 2939433 | 6/1999 |
| JP | 2001-226431 | 8/2001 |

* cited by examiner

*Primary Examiner*—Helen L. Pezzuto
(74) *Attorney, Agent, or Firm*—Roylance, Abrams, Berdo & Goodman, L.L.P.

(57) ABSTRACT

The present invention provides a vinylpyrrolidone (co) polymer excellent in the color tone and the thermal yellowing resistance despite its low molecular weight. The vinylpyrrolidone (co)polymer, according to the present invention, is a vinylpyrrolidone (co)polymer which has a Hazen value of not more than 30 in the form of 5% aqueous solution and a K value of not more than 60 and is obtained by a process including the step of polymerizing a polymerizable monomer component with an azo compound initiator and/or an organic peroxide initiator, wherein the polymerizable monomer component includes N-vinylpyrrolidone, and wherein the azo compound initiator has a chemical structure as shown by —C(CH$_3$)$_2$—N=N—C(CH$_3$)$_2$—, and wherein the organic peroxide initiator is soluble in water or ethyl alcohol of 25° C. in an amount of not smaller than 3 weight %.

3 Claims, No Drawings

VINYLPYRROLIDONE (CO)POLYMER

BACKGROUND OF THE INVENTION

A. Technical Field

The present invention relates to a vinylpyrrolidone (co) polymer. More particularly, the present invention relates to a novel vinylpyrrolidone (co)polymer excellent in the color tone and the thermal yellowing resistance despite its low molecular weight.

B. Background Art

Vinylpyrrolidone (co)polymers, such as poly (vinylpyrrolidone) and vinylpyrrolidone copolymers, are widely used in various fields of such as medicines, cosmetics, pressure sensitive adhesives or adhesives, paints, dispersants, inks, and electronic parts, because the vinylpyrrolidone (co)polymers are excellent in such as biocompatibility, safety, and hydrophilicity. In addition, crosslinked products of the vinylpyrrolidone (co)polymers are useful also as water-absorbent resins for various uses requiring water absorption and water retention, for example, disposable diapers.

On the other hand, conventional vinylpyrrolidone (co) polymers relatively easily color, and, especially in the case of subjecting them to thermal hysteresis, the degree of the coloring is high. This tendency is remarkable especially in the case where the vinylpyrrolidone (co)polymers have low molecular weights. Thus, as to the reason why the degree of the coloring is high in the case where the vinylpyrrolidone (co)polymers have low molecular weights, various factors can be considered. For example, there can be cited such that: the lowering of the molecular weights of the vinylpyrrolidone (co)polymers needs to use so relatively large an amount of initiator as to easily cause a side reaction. That is to say, of low-molecular vinylpyrrolidone (co)polymers having a K value of not more than 60, those which are excellent in the color tone, especially, the thermal yellowing resistance, have not been known so far. Thus, there has been a problem that it is difficult to apply the conventional vinylpyrrolidone (co)polymers to uses demanding a vinylpyrrolidone (co)polymer which has a low molecular weight and is excellent in the color tone and the thermal yellowing resistance, such as paints, resin-modifying agents, surface-treating agents, ink-receiving layers, various primers, and various binders.

So far, there have been made several studies to suppress the coloring of the vinylpyrrolidone (co)polymers.

JP-A-062804/1987 (Kokai) discloses a process in which the coloring of a vinylpyrrolidone (co)polymer is suppressed by adjusting pH with a carbonate or hydrogencarbonate when polymerizing N-vinylpyrrolidone by using hydrogen peroxide. However, the effect of suppressing the coloring by this process is insufficient, therefore it is still unsatisfactory for the application to the uses demanding a vinylpyrrolidone (co)polymer which has a low molecular weight and is excellent in the color tone and the thermal yellowing resistance.

U.S. Pat. No. 3,459,720 discloses a process in which the coloring of a vinylpyrrolidone (co)polymer is suppressed by using azoisobutyronitrile and a hydroperoxide together when polymerizing N-vinylpyrrolidone. However, the effect of suppressing the coloring by this process is also insufficient, therefore it is still unsatisfactory for the application to the uses demanding a vinylpyrrolidone (co) polymer which has a low molecular weight and is excellent in the color tone and the thermal yellowing resistance.

JP-A-507097/1993 (Kohyo) discloses a process in which the coloring of a vinylpyrrolidone (co)polymer is suppressed by using t-butyl peroxypivalate and a chelating buffer together when polymerizing N-vinylpyrrolidone. However, this process results in obtaining a vinylpyrrolidone (co) polymer having a high molecular weight, and further, the effect of suppressing the coloring by this process is also insufficient, therefore it is still unsatisfactory for the application to the uses demanding a vinylpyrrolidone (co) polymer which has a low molecular weight and is excellent in the color tone and the thermal yellowing resistance.

SUMMARY OF THE INVENTION

A. Object of the Invention

Accordingly, an object of the present invention is to provide a vinylpyrrolidone (co)polymer excellent in the color tone and the thermal yellowing resistance despite its low molecular weight.

B. Disclosure of the Invention

The present inventors diligently studied to solve the aforementioned problems. As a result, the inventors have found that the aforementioned problems can be solved by using a specific initiator when a polymerizable monomer component including N-vinylpyrrolidone is polymerized to obtain a vinylpyrrolidone (co)polymer.

That is to say, a vinylpyrrolidone (co)polymer, according to the present invention, is a vinylpyrrolidone (co)polymer which has a Hazen value of not more than 30 in the form of 5% aqueous solution and a K value of not more than 60 and is obtained by a process including the step of polymerizing a polymerizable monomer component with an azo compound initiator and/or an organic peroxide initiator, wherein the polymerizable monomer component includes N-vinylpyrrolidone, and wherein the azo compound initiator has a chemical structure as shown by —C(CH$_3$)$_2$—N=N—C(CH$_3$)$_2$—, and wherein the organic peroxide initiator is soluble in water or ethyl alcohol of 25° C. in an amount of not smaller than 3 weight %.

These and other objects and the advantages of the present invention will be more fully apparent from the following detailed disclosure.

DETAILED DESCRIPTION OF THE INVENTION

The vinylpyrrolidone (co)polymer, according to the present invention, is obtained by a process including the step of polymerizing a polymerizable monomer component with a specific initiator, wherein the polymerizable monomer component includes N-vinylpyrrolidone.

As to the N-vinylpyrrolidone as essentially included in the aforementioned polymerizable monomer component, whatever production process it may be a product obtained by, it is useable. Specific examples of the production process include: what is called Reppe process which comprises the steps of causing ammonia to add to butyrolactone, and then dehydrating the resultant product to synthesize 2-pyrrolidone, and then causing acetylene to further add thereto to synthesize the N-vinylpyrrolidone; a process comprising the steps of causing ethanolamine to add to butyrolactone with dehydration to synthesize N-hydroxyethylpyrrolidone, and then further dehydrating it to synthesize the N-vinylpyrrolidone. In addition, in the case of the latter process, examples thereof include what is called a gas phase dehydration process which uses a gas phase dehydration process in the step of dehydrating the N-hydroxyethylpyrrolidone to synthesize the N-vinylpyrrolidone.

Of the N-vinylpyrrolidone as obtained by the aforementioned various production processes, N-vinylpyrrolidone as produced by the process not using acetylene (more specifically, N-vinylpyrrolidone as obtained by carrying out a gas phase dehydration reaction of N-hydroxyethylpyrrolidone) is preferable for sufficiently displaying the effects of the present invention.

In addition, for sufficiently displaying the effects of the present invention, it is favorable that the aforementioned N-hydroxyethylpyrrolidone, of which the gas phase dehydration reaction is to be carried out, is a product obtained by carrying out a reaction of γ-butyrolactone with monoethanolamine wherein the γ-butyrolactone is a derivative from at least one member selected from the group consisting of maleic anhydride, butadiene and 1,4-butanediol.

The specific process for carrying out the gas phase dehydration reaction of the N-hydroxyethylpyrrolidone is not especially limited, but, for example, processes as reported in JP-A-141402/1996 (Kokai) and Japanese Patent No.2939433 can be adopted.

More specifically, for example, the reaction is carried out with a reactor, such as a fixed-bed flow type reactor, a fluidized-bed type reactor, or a moving-bed type reactor, at such a reaction temperature and under such a reaction pressure that the N-hydroxyethylpyrrolidone which is a raw reaction material can maintain its gas phase state. The reaction temperature is favorably in the range of 300 to 500° C., and more favorably 350 to 450° C. In the case where the reaction temperature is lower than 300° C., there is a possibility that the conversion lowers with the result that the productivity lowers. In the case where the reaction temperature is higher than 500° C., there is a possibility that the side reaction ratio increases with the result that the selectivity of the N-vinylpyrrolidone as aimed lowers. As to the reaction pressure, the partial pressure of the N-hydroxyethylpyrrolidone which is a raw reaction material is favorably in the range of $6.7 \times 10^2$ to $8.0 \times 10^4$ kPa (5 to 600 mmHg), more favorably $1.3 \times 10^3$ to $4.0 \times 10^4$ kPa (10 to 300 mmHg). In the case where the partial pressure of the N-hydroxyethylpyrrolidone which is a raw reaction material is lower than $6.7 \times 10^2$ kPa (5 mmHg), there is a strong likelihood of being able to carry out the reaction itself without great hindrance, but there is nevertheless a possibility that it is difficult to collect the product. In the case where the partial pressure of the N-hydroxyethylpyrrolidone which is a raw reaction material is higher than $8.0 \times 10^4$ kPa (600 mmHg), there is a possibility that the side reaction ratio increases with the result that the selectivity of the N-vinylpyrrolidone as aimed lowers.

In addition, the specific process for obtaining the N-hydroxyethylpyrrolidone by carrying out a reaction of γ-butyrolactone with monoethanolamine, wherein the γ-butyrolactone is a derivative from at least one member selected from the group consisting of maleic anhydride, butadiene and 1,4-butanediol, is not especially limited, but, for example, processes as reported in JP-A-226431/2001 (Kokai) can be adopted, more specifically, as follows.

For example, as to the process for producing the γ-butyrolactone from the maleic anhydride, there is known a process including the step of carrying out a gas phase reaction of hydrogen and the maleic anhydride in the presence of a reducing catalyst. The reaction temperature in this process is favorably in the range of 100 to 400° C., more favorably 260 to 320° C. The molar ratio of the maleic anhydride to the hydrogen (maleic anhydride:hydrogen) is favorably in the range of (1:20) to (1:250), more favorably (1:40) to (1:100).

As to the process for producing the γ-butyrolactone from the 1,4-butanediol, there is known a process including the step of carrying out dehydrogenation of the 1,4-butadiol in a gas phase by using copper as a catalyst. The reaction temperature in this process is favorably in the range of 150 to 300° C., more favorably 180 to 260° C. The reaction pressure is favorably in the range of $1.0 \times 10^5$ to $4.0 \times 10^6$ kPa (750 to 30,000 mmHg), more favorably $1.0 \times 10^5$ to $1.0 \times 10^6$ kpa (750 to 7,500 mmHg).

As to the process for producing the γ-butyrolactone from the butadiene, the butadiene is acetoxylated by causing it to react with acetic acid and oxygen (favorably, in the temperature range of 40 to 180° C. and under a pressure of not lower than ordinary pressure) in the presence of a palladium-containing catalyst, and then the resultant diacetoxybutene is hydrogenated by bringing it into contact with hydrogen (favorably, in the temperature range of 40 to 180° C. and under a pressure of not lower than ordinary pressure) in the presence of a noble metal catalyst (such as palladium or ruthenium) to thereby obtain diacetoxybutane. Furthermore, the resultant diacetoxybutane is hydrolyzed by using 2 to 100 mols of water per 1 mol of the diacetoxybutane (favorably in the temperature range of 30 to 110° C., more favorably 40 to 90° C.) with a solid acid catalyst to thereby obtain 1,4-butanediol, and then the resultant 1,4-butanediol is subjected to the same reaction as the aforementioned one, thus producing the γ-butyrolactone.

To the γ-butyrolactone as derived from at least one member selected from the group consisting of maleic anhydride, butadiene and 1,4-butanediol in the above way, there is added the monoethanolamine (favorably in an equimolar amount) to carry out their reaction (favorably in the temperature range of 150 to 400° C., more favorably 200 to 300° C.), whereby the N-hydroxyethylpyrrolidone can be obtained. In the case where the reaction temperature is lower than 150° C., there is a possibility that the conversion lowers with the result that the productivity lowers. In the case where the reaction temperature is higher than 400° C., there is a possibility that the side reaction ratio increases with the result that the selectivity of the N-hydroxyethylpyrrolidone as aimed lowers.

There is no especial limitation in the polymerizable monomer component if it includes at least the N-vinylpyrrolidone. For example, the N-vinylpyrrolidone may be used either alone or in combination with any polymerizable monomer that can be copolymerized with the N-vinylpyrrolidone. Incidentally, when the polymerizable monomer other than the N-vinylpyrrolidone is copolymerized therewith, although not especially limited, the N-vinylpyrrolidone content in the polymerizable monomer components is favorably not less than 50 weight %, more favorably not less than 60 weight %, still more favorably not less than 70 weight %, especially favorably not less than 80 weight %.

The polymerizable monomer that can be copolymerized with the N-vinylpyrrolidone is not especially limited. Specific examples thereof include: (meth)acrylate esters such as methyl (meth)acrylate, ethyl (meth)acrylate, butyl (meth) acrylate, cyclohexyl (meth)acrylate, and hydroxyethyl (meth)acrylate; (meth)acrylamide and derivatives therefrom such as N-monomethyl(meth)acrylamide, N-monoethyl (meth)acrylamide, and N,N-dimethyl(meth)acrylamide; basic unsaturated monomers (e.g. dimethylaminoethyl (meth)acrylate, dimethylaminoethyl(meth)acrylamide, vinylpyridine, and vinylimidazole) and their salts or quaternized products; vinylamides such as vinylformamide, vinylacetamide, and vinyloxazolidone; carboxyl-group-containing unsaturated monomers (e.g. (meth)acrylic acid, itaconic acid, maleic acid, and fumaric acid) and their salts; unsaturated anhydrides such as maleic anhydride and itaconic anhydride; vinyl esters such as vinyl acetate and vinyl propionate; vinylethylene carbonate and derivatives therefrom; styrene and derivatives therefrom; 2-sulfoethyl (meth) acrylate and derivatives therefrom; vinylsulfonic acid and derivatives therefrom; vinyl ethers such as methyl vinyl ether, ethyl vinyl ether, and butyl vinyl ether; and olefms such as ethylene, propylene, octene, and butadiene. In respect of such as the copolymerizability with the N-vinylpyrrolidone, there are above all preferred the following: the (meth)acrylate esters, the (meth)acrylamide and derivatives therefrom, the basic unsaturated monomers and their salts or quaternized products, the vinylamides, the carboxyl-group-containing unsaturated monomers and their salts, the vinyl esters, and the vinylethylene carbonate and derivatives therefrom, and there are above all especially preferred the following: the (meth)acrylate esters, the basic unsaturated monomers and their salts or quaternized products, and the carboxyl-group-containing unsaturated monomers and their salts. These may be copolymerized with the N-vinylpyrrolidone by being used either alone respectably or in combinations with each other.

The method for carrying out the polymerization reaction to obtain the vinylpyrrolidone (co)polymer according to the present invention is not especially limited, but the polymerization reaction, for example, can be carried out by conventional polymerization methods such as solution polymerization, emulsion polymerization, suspension polymerization and precipitation polymerization. Of these polymerization methods, the solution polymerization is preferable, and aqueous solution polymerization is especially preferable in respect of safety and economy.

As to solvents usable in the aforementioned polymerization reaction, water is preferable. However, a solvent that can dissolve in water can also be used by mixing it with water. Examples of such a solvent include at least one member selected from the group consisting of such as alcohols (e.g. methyl alcohol, ethyl alcohol, isopropyl alcohol, n-butyl alcohol, and diethylene glycol). Particularly, if a mixed solvent obtained by mixing water with a solvent such as isopropyl alcohol or n-butyl alcohol is used, there are advantages of inhibiting side reactions because the boiling point of water, namely, the polymerization temperature, becomes lower due to azeotropic function.

When carrying out the aforementioned polymerization reaction, the reaction conditions such as reaction temperature and pressure are not especially limited. For examples, the reaction temperature is favorably in the range of 20 to 150° C., more favorably 50 to 130° C., especially favorably 80 to 110° C. In addition, the pressure in the reaction system is favorably either ordinary pressure or reduced pressure, especially favorably ordinary pressure.

As to the polymerization reaction to obtain the vinylpyrrolidone (co)polymer according to the present invention, it is important and one of the characteristics of the present invention to use an azo compound initiator and/or an organic peroxide initiator, wherein the azo compound initiator has a chemical structure as shown by —C(CH$_3$)$_2$—N=N—C(CH$_3$)$_2$—, and wherein the organic peroxide initiator is soluble in water or ethyl alcohol of 25° C. in an amount of not smaller than 3 weight %.

As to the azo compound initiator having the chemical structure as shown by —C(CH$_3$)$_2$—N=N—C(CH$_3$)$_2$—, examples thereof include 2,2'-azobis[2-metyl-N-(2-(1-hydroxybutyl))propionamide], 2,2'-azobis[2-metyl-N-(2-hydroxyethyl)propionamide], 2,2'-azobis[N-(2-propenyl)-2-methylpropionamide], 2,2'-azobis[N-butyl-2-methylpropionamide], 2,2'-azobis[N-cyclohexyl-2-methylpropionamide], 2,2'-azobis[2-(5-metyl-2-imidazolin-2-yl)propane]dihydrochloride, 2,2'-azobis[2-(2-imidazolin-2-yl)propane]dihydrochloride, 2,2'-azobis[2-(2-imidazolin-2-yl)propane]disulfate dihydrate, 2,2'-azobis[2-(3,4,5,6-tetrahydropyridin-2-yl)propane]dihydrochloride, 2,2'-azobis [2-(1-(2-hydroxyethyl)-2-imidazolin-2-yl)propane] dihydrochloride, 2,2'-azobis(2-amidinopropane) dihydrochloride, 2,2'-azobis[2-(N-(2-carboxyethyl) atnidino)propane]dihydrochloride, dimethyl 2,2'-azobis(2-methylpropionate). Of these, the 2,2'-azobis[2-metyl-N-(2-hydroxyethyl)propionamide] and the dimethyl 2,2'-azobis (2-methylpropionate) are preferable, and the dimethyl 2,2'-azobis(2-methylpropionate) is especially preferable. These may be used either alone respectably or in combinations with each other.

As to the organic peroxide initiator which is soluble in water or ethyl alcohol of 25° C. in an amount of not smaller than 3 weight %, examples thereof include diisopropyl peroxydicarbonate, dicumyl peroxide, di-t-butyl peroxyhexahydroterephthalate, di-t-butyl peroxide, t-butyl hydroperoxide, t-amyl peroxy-2-ethylhexanoate, and t-butyl peroxy-2-ethylhexanoate. Of these, the t-butyl hydroperoxide and the t-amyl peroxy-2-ethylhexanoate are preferable, and the t-amyl peroxy-2-ethylhexanoate is especially preferable. These may be used either alone respectably or in combinations with each other.

The aforementioned azo compound initiator having the chemical structure as shown by —C(CH$_3$)$_2$—N=N—C(CH$_3$)$_2$— and the aforementioned organic peroxide initiator which is soluble in water or ethyl alcohol of 25° C. in an amount of not smaller than 3 weight % may be used in combination with each other.

Although not especially limited, the amount of the aforementioned initiator as used is favorably in the range of 0.01 to 10 weight %, more favorably 0.1 to 5 weight %, still more favorably 0.5 to 3 weight %, relative to the polymerizable monomer component.

When carrying out the aforementioned polymerization reaction, conventional basic pH-adjusting agents can be used to promote the polymerization reaction or to prevent hydrolysis of the N-vinylpyrrolidone. The addition of the pH-adjusting agent can be carried out by any method. For example, the pH-adjusting agent may be charged into the system in the initial stage of the polymerization or added one by one into the system during the polymerization. Specific examples of the pH-adjusting agent include ammonia, aliphatic amines, aromatic amines, sodium hydroxide, and potassium hydroxide. Of these, the ammonia is particularly preferable. These may be used either alone respectively or in combinations with each other. When using the pH-adjusting agent, although its amount is not especially limited, the pH-adjusting agent is favorably used in such an amount that the pH of the solution during the polymerization will be in the range of 5 to 10, more favorably 7 to 9.

When carrying out the aforementioned polymerization reaction, conventional transition metal salts can be used in order to, for example, promote the polymerization reaction. Specific examples of the transition metal salt include carboxylates and chlorides of such as copper, iron, cobalt and nickel. Of these, particularly, the carboxylates and chlorides of copper and iron are preferable. These may be used either alone respectively or in combinations with each other. When using the transition metal salt, although not especially limited, its amount is favorably in the range of 0.1 to 20,000 ppb, more favorably 1 to 5,000 ppb, in ratio by weight to the polymerizable monomer component.

When carrying out the aforementioned polymerization reaction, such as any chain transfer agent or buffering agent can, if necessary, be used in addition to the aforementioned polymerization initiator and, as the occasion demands, the aforementioned pH-adjusting agent or transition metal salt.

When carrying out the aforementioned polymerization reaction, the method for adding the aforementioned components to be charged is not especially limited, but the addition can be carried out by any method of such as batch types and continuous types.

The vinylpyrrolidone (co)polymer, according to the present invention, is a (co)polymer excellent in the color tone and the thermal yellowing resistance, and is characterized by having a Hazen value of not more than 30 in the form of 5% aqueous solution. The method for measuring the Hazen value of the 5% aqueous solution is described in detail below. The Hazen value of the 5% aqueous solution is favorably not more than 25, more favorably not more than 20, still more favorably not more than 15, yet still more favorably not more than 10, most favorably not more than 5. In case where the Hazen value of the 5% aqueous solution is more than 30, the excellence in the color tone and the thermal yellowing resistance, which is an effect of the present invention, cannot be displayed.

The vinylpyrrolidone (co)polymer, according to the present invention, is further characterized by displaying a K value of not more than 60.

Herein, the K value is a value which is indicated by Fikentscher's equation from values as measured in the following way: the vinylpyrrolidone (co)polymer is dissolved into any solvent, in which the vinylpyrrolidone (co)polymer is soluble, in concentrations of not higher than 10 weight %, and the respective viscosities of the resultant solutions are measured at 25° C. with a capillary viscometer.

The Fikentscher's equation is the following:

$$(\log \eta_{rel})/C = [(75K_0^2)/(1+1.5K_0C)] + K_0$$

$$K = 1000K_0$$

(wherein: C denotes the grams of the vinylpyrrolidone (co)polymer in 100 ml of the solution; and $\eta_{rel}$ denotes the viscosity of the solution according to the solvent).

The K value is favorably not more than 50, more favorably not more than 45, still more favorably not more than 40, yet sill more favorably not more than 35, especially favorably not more than 30. In the case where the K value is more than 60, the vinylpyrrolidone (co)polymer is unsuitable for uses such as resin-modifying because the melt viscosity is too high, and further this (co)polymer is unsuitable for uses as made by being coated such as paints because the solution viscosity is too high.

Furthermore, as to the vinylpyrrolidone (co)polymer according to the present invention, it is favorable that the Hazen value of the 5% aqueous solution of this (co)polymer is not more than 100 after the passage of a thermal hysteresis at an atmospheric temperature of 150° C. under an air atmosphere for 30 minutes. The method for measuring the Hazen value of the 5% aqueous solution, after the passage of a thermal hysteresis at an atmospheric temperature of 150° C. under an air atmosphere for 30 minutes, is described in detail below. The Hazen value of the 5% aqueous solution, after the passage of a thermal hysteresis at an atmospheric temperature of 150° C. under an air atmosphere for 30 minutes, is more favorably not more than 90, still more favorably not more than 80, yet still more favorably not more than 70, yet still more favorably not more than 60, especially favorably not more than 50, most favorably not more than 40. In the case where the Hazen value of the 5% aqueous solution, after the passage of a thermal hysteresis at an atmospheric temperature of 150° C. under an air atmosphere for 30 minutes, is more than 100, there is a possibility that the excellence in the color tone and the thermal yellowing resistance, which is an effect of the present invention, cannot sufficiently be displayed.

Because, as is aforementioned, the vinylpyrrolidone (co)polymer, according to the present invention, is excellent in the color tone and the thermal yellowing resistance despite its low molecular weight, this (co)polymer is useable for various uses demanding a vinylpyrrolidone (co)polymer which has a low molecular weight and is excellent in the color tone and the thermal yellowing resistance, such as paints, resin-modifying agents, surface-treating agents, ink-receiving layers, various primers, and various binders.

(Effects and Advantages of the Invention):

The present invention can provide a vinylpyrrolidone (co)polymer excellent in the color tone and the thermal yellowing resistance despite its low molecular weight.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to these examples in any way. Incidentally, unless otherwise noted, the unit "part(s)" hereinafter denotes "part(s) by weight".

SYNTHETIC EXAMPLE 1

An amount of 65 parts of ion-exchanged water was added into a reaction vessel, and then its temperature was raised to a reflux temperature (100° C.) while blowing nitrogen thereinto. Under stirred conditions, 30 parts of N-vinylpyrrolidone and a solution (as prepared by dissolving 1.5 parts of dimethyl 2,2'-azobis(2-methylpropionate) (V-601, made by Wako Pure Chemical Industries, Ltd.) into 5 parts of ethanol) were dropwise added thereinto at the same time for 2 hours each. After the dropwise addition had been completed, the reaction was further continued for 2 hours with the reflux state still kept, thus obtaining a poly(vinylpyrrolidone) (P1) having a K value of 30.

Incidentally used as the above N-vinylpyrrolidone was N-vinylpyrrolidone (1) as obtained by a process including the steps of: carrying out a reaction of γ-butyrolactone with monoethanolamine to thus form N-hydroxyethylpyrrolidone wherein the γ-butyrolactone was a derivative from maleic anhydride; and then carrying out a gas phase dehydration reaction of the resultant N-hydroxyethylpyrrolidone.

Specifically, the N-vinylpyrrolidone (1) was synthesized in the following way. That is to say, maleic anhydride and hydrogen were supplied at the rates of 0.01 mol and 1 mol respectively per hour into a reaction tube as packed with a copper chromite catalyst, and then they were caused to react together at 265° C. to obtain γ-butyrolactone. An equimolar amount of monoethanolamine was added to the resultant γ-butyrolactone, and then their reaction was carried out at 250° C. in an autoclave to prepare N-hydroxyethylpyrrolidone. Next, a reaction tube was packed with a catalyst as prepared from lithium nitrate and silicon oxide, and then a raw gas (as prepared by diluting the N-hydroxyethylpyrrolidone with nitrogen to such an extent that the partial pressure of the N-hydroxyethylpyrrolidone would be $1.01 \times 10^4$ kPa (76 mmHg)) was supplied thereinto at a space velocity of the N-hydroxyethylpyrrolidone of 200 $h^{-1}$ to make the N-hydroxyethylpyrrolidone react at a reaction temperature of 400° C. under an ordinary pressure. Thus the N-vinylpyrrolidone (1) was synthesized.

SYNTHETIC EXAMPLE 2

A poly(vinylpyrrolidone) (P2) having a K value of 39 was obtained in the same way as of Synthetic Example 1 except that, as to the initiator, 0.75 part of t-amyl peroxy-2-ethylhexanoate (TRIGONOX 121, produced by Kayaku Akzo Co., Ltd.) was used instead of the dimethyl 2,2'-azobis(2-methylpropionate).

SYNTHETIC EXAMPLE 3

A poly(vinylpyrrolidone) (P3) having a K value of 30 was obtained in the same way as of Synthetic Example 1 except that N-vinylpyrrolidone (2) was used as the N-vinylpyrrolidone, wherein the N-vinylpyrrolidone (2) was obtained by a process including the steps of: carrying out a reaction between γ-butyrolactone and ammonia to thus form 2-pyrrolidone wherein the γ-butyrolactone was a derivative from 1,4-butanediol; and then carrying out an addition reaction of acetylene to the 2-pyrrolidone.

Specifically, the N-vinylpyrrolidone (2) was synthesized in the following way. That is to say, 1,4-butanediol was supplied at a rate of 0.45 mol per hour into a reaction tube as packed with a copper catalyst, and then its reaction was carried out at 210° C. to obtain γ-butyrolactone. Ammonia was caused to add to the resultant γ-butyrolactone, and then the resultant addition product was dehydrated to obtain 2-pyrrolidone. Next, this 2-pyrrolidone as obtained and potassium cyclohexyl alcoholate as a catalyst were packed into an autoclave, and then the air in the autoclave was replaced with nitrogen sufficiently and then further with acetylene sufficiently. Then acetylene was introduced thereinto to $1.3 \times 10^2$ kPa, and then, while the agitation was carried out at 900 rpm under this pressure, the temperature was raised to carry out a reaction at a reaction temperature of 140° C., thus synthesizing the N-vinylpyrrolidone (2).

SYNTHETIC EXAMPLE 4

A poly(vinylpyrrolidone) (P4) having a K value of 39 was obtained in the same way as of Synthetic Example 2 except that the N-vinylpyrrolidone (2) was used as the N-vinylpyrrolidone, wherein the N-vinylpyrrolidone (2) was obtained by a process including the steps of: carrying out a reaction between γ-butyrolactone and ammonia to thus form 2-pyrrolidone wherein the γ-butyrolactone was a derivative from 1,4-butanediol; and then carrying out an addition reaction of acetylene to the 2-pyrrolidone.

SYNTHETIC EXAMPLE 5

An amount of 60 parts of ion-exchanged water and 1 part of 0.01% aqueous copper sulfate solution were added into a reaction vessel, and then its temperature was raised to a reflux temperature (100° C.) while blowing nitrogen thereinto. Under stirred conditions, 30 parts of N-vinylpyrrolidone and 10 parts of 1% aqueous hydrogen peroxide solution were dropwise added thereinto for 1 hour. During the dropwise addition, pH in the reaction system was adjusted into the range of 7.5 to 8.5 by appropriately adding ammonia water. After the dropwise addition had been completed, the reaction was further continued for 2 hours with the reflux state still kept, thus obtaining a poly(vinylpyrrolidone) (P5) having a K value of 30.

Incidentally used as the above N-vinylpyrrolidone was the N-vinylpyrrolidone (2) as obtained by a process including the steps of: carrying out a reaction between γ-butyrolactone and ammonia to thus form 2-pyrrolidone wherein the γ-butyrolactone was a derivative from 1,4-butanediol; and then carrying out an addition reaction of acetylene to the 2-pyrrolidone.

SYNTHETIC EXAMPLE 6

A poly(vinylpyrrolidone) (P6) having a K value of 29 was obtained in the same way as of Synthetic Example 3 except that 2,2'-azobis(isobutyronitrile) (AIBN) was used as the initiator.

EXAMPLES 1 TO 4, COMPARATIVE EXAMPLES 1 TO 2

The poly(vinylpyrrolidone) (P1) to (P6), as obtained in Synthetic Examples 1 to 6, were measured by Hazen values of their 5% aqueous solutions (initial Hazen values) and by those after the passage of a thermal hysteresis at an atmospheric temperature of 150° C. under an air atmosphere for 30 minutes (150° C. Hazen values). Their results are shown in Table 1.

Incidentally, the methods for measuring the Hazen values of the 5% aqueous solutions (initial Hazen values) and those after the passage of a thermal hysteresis at an atmospheric temperature of 150° C. under an air atmosphere for 30 minutes (150° C. Hazen values) are as follows.

(Initial Hazen Value):

The poly(vinylpyrrolidone) was dissolved into ion-changed water to prepare a 5% aqueous solution. Then its Hazen value was determined. The measurement of this Hazen value was carried out in accordance with JIS K0071.

The details of the measurement of the Hazen value are as follows. That is to say, a sample and Hazen standard calorimetric liquids were placed into their respective colorimetric tubes to their standard lines, and then these tubes were put on a white board, and then their colors were compared by looking though the liquids downward from the upside with the eye. The color number of the Hazen standard calorimetric liquid of which the color most approximated that of the sample was defined as the Hazen value. In the case where the color of the sample was in the middle between those of two standard colorimetric liquids, the color number of whichever was darker of these two was selected.

(150° C. Hazen Value):

An amount of 1 g of powder of the poly(vinylpyrrolidone) was heat-treated with a hot-wind dryer of 150° C. for 30 minutes and then dissolved into ion-changed water to prepare a 5% aqueous solution. Then its Hazen value was determined. The measurement of this Hazen value was carried out in accordance with JIS K0071. The details of the measurement of the Hazen value are as aforementioned.

TABLE 1

| | Poly-(vinyl-pyrrolidone) | K value | Initiator | Process for synthesizing N-vinyl-pyrrolidone | Initial Hazen value | 150° C. Hazen value |
|---|---|---|---|---|---|---|
| Example 1 | Synthetic Example 1 | 31 | V-601 | Gas phase dehydration process | 5 | 30 |
| Example 2 | Synthetic Example 2 | 39 | TRIGONOX 121 | Gas phase dehydration process | 5 | 50 |
| Example 3 | Synthetic Example 3 | 31 | V-601 | Acetylene process | 30 | 60 |
| Example 4 | Synthetic Example 4 | 39 | TRIGONOX 121 | Acetylene process | 30 | 80 |
| Comparative Example 1 | Synthetic Example 5 | 30 | Hydrogen peroxide | Acetylene process | 40 | 110 |
| Comparative Example 2 | Synthetic Example 6 | 29 | AIBN | Acetylene process | 40 | 120 |

Various details of the invention may be changed without departing from its spirit not its scope. Furthermore, the forgoing description of the preferred embodiments according to the present invention is provided for the purpose of illustration only, and not for the purpose of limiting the invention as defined by the appended claims and their equivalents.

What is claimed is:

1. A vinylpyrrolidone (co)polymer, which has a Hazen value of not more than 30 in the form of 5% aqueous solution and a K value of not more than 60, with the vinylpyrrolidone (co)polymer being obtained by a process including the step of polymerizing a polymerizable monomer component with an azo compound initiator and/or an organic peroxide initiator, wherein the polymerizable monomer component includes N-vinylpyrrolidone, and wherein the azo compound initiator has a chemical structure as shown by —C(CH$_3$)$_2$—N=N—C(CH$_3$)$_2$—, and wherein the organic peroxide initiator is soluble in water or ethyl alcohol of 25° C. in an amount of not smaller than 3 weight %.

2. A vinylpyrrolidone (co)polymer according to claim 1, of which the Hazen value of the 5% aqueous solution is not more than 100 after the passage of a thermal hysteresis at an atmospheric temperature of 150° C. under an air atmosphere for 30 minutes.

3. A vinylpyrrolidone (co)polymer according to claim 1, wherein the N-vinylpyrrolidone is a product obtained by a process including the steps of: carrying out a reaction of γ-butyrolactone with monoethanolamine to thus form N-hydroxyethylpyrrolidone wherein the γ-butyrolactone is a derivative from at least one member selected from the group consisting of maleic anhydride, butadiene and 1,4-butanediol; and then carrying out a gas phase dehydration reaction of the resultant N-hydroxyethylpyrrolidone.

* * * * *